(12) United States Patent
Sapper et al.

(10) Patent No.: US 9,400,083 B2
(45) Date of Patent: Jul. 26, 2016

(54) SUPPORT APPARATUS FOR MULTIPLE DISPLAY DEVICES

(71) Applicant: Knoll, Inc., East Greenville, PA (US)

(72) Inventors: Richard Sapper, Milan (IT); Ronald Snyder, Macungie, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 14/672,864

(22) Filed: Mar. 30, 2015

(65) Prior Publication Data

US 2015/0309532 A1 Oct. 29, 2015

Related U.S. Application Data

(60) Provisional application No. 61/983,603, filed on Apr. 24, 2014.

(51) Int. Cl.
| | |
|---|---|
| F16M 11/00 | (2006.01) |
| F16M 13/02 | (2006.01) |
| F16M 11/08 | (2006.01) |
| F16M 11/20 | (2006.01) |
| F16M 11/24 | (2006.01) |

(52) U.S. Cl.
CPC .............. *F16M 13/022* (2013.01); *F16M 11/08* (2013.01); *F16M 11/2014* (2013.01); *F16M 11/2085* (2013.01); *F16M 11/2092* (2013.01); *F16M 11/24* (2013.01); *F16M 2200/044* (2013.01); *F16M 2200/063* (2013.01)

(58) Field of Classification Search
CPC ... F16M 11/04; F16M 11/08; F16M 11/2085; F16M 11/24; F16M 11/12; F16M 13/022; F16M 11/2014; F16M 11/2092
See application file for complete search history.

(56) References Cited

U.S. PATENT DOCUMENTS

| | | | |
|---|---|---|---|
| 4,844,387 | A | 7/1989 | Sorgi et al. |
| 5,553,820 | A | 9/1996 | Karten et al. |
| 5,687,939 | A | 11/1997 | Moscovitch |
| 5,772,174 | A | 6/1998 | Hirsch et al. |
| 5,992,809 | A | 11/1999 | Sweere et al. |
| 6,343,006 | B1 | 1/2002 | Moscovitch et al. |
| 6,499,704 | B2 | 12/2002 | Oddsen, Jr. |

(Continued)

FOREIGN PATENT DOCUMENTS

| | | |
|---|---|---|
| GB | 2440606 A | 4/2007 |
| WO | 2007118862 A1 | 10/2007 |

(Continued)

*Primary Examiner* — Amy Sterling
(74) *Attorney, Agent, or Firm* — Buchanan Ingersoll & Rooney PC (57) ABSTRACT

A support apparatus for supporting multiple display devices includes an elongated member having at least one groove and/or spline positioned in a rear surface of the elongated member. A connector is attached to the rear surface of the elongated member adjacent a central portion of the rear surface. A first display device collar is attached to the elongated member adjacent a first end of the elongated member and is slideable along the groove or spline of the elongated member from adjacent the first end to adjacent the connector. A second display device collar is attached to the elongated member adjacent a second end of the elongated member and is slideable along the groove or spline of the elongated member from adjacent the second end to adjacent the connector. Display device mounting devices are pivotally connectable to the first and second display device collars for attachment to the elongated member.

21 Claims, 7 Drawing Sheets

(56) References Cited

U.S. PATENT DOCUMENTS

| | | |
|---|---|---|
| 6,505,988 B1 | 1/2003 | Oddsen, Jr. |
| 6,554,235 B1 | 4/2003 | Fortier |
| 6,554,238 B1 | 4/2003 | Hibberd |
| 6,679,096 B1 | 1/2004 | Lazik et al. |
| 6,702,604 B1 | 3/2004 | Moscovitch |
| 6,739,096 B2 | 5/2004 | Feldpausch et al. |
| 6,863,252 B2 | 3/2005 | Bosson |
| 6,905,101 B1 | 6/2005 | Dittmer |
| D518,063 S | 3/2006 | Piazza et al. |
| 7,014,157 B2 | 3/2006 | Oddsen |
| 7,048,242 B2 | 5/2006 | Oddsen, Jr. |
| D537,323 S | 2/2007 | Saez |
| 7,182,301 B1 | 2/2007 | Oddsen, Jr. et al. |
| 7,246,780 B2 | 7/2007 | Oddsen, Jr. |
| 7,252,277 B2 | 8/2007 | Sweere et al. |
| 7,369,401 B1 * | 5/2008 | Floersch ............ F16M 11/04 292/301 |
| 7,389,965 B2 | 6/2008 | Oddsen, Jr. et al. |
| 7,392,969 B2 | 7/2008 | Chiu et al. |
| 7,652,876 B2 | 1/2010 | Moscovitch |
| 8,342,462 B2 | 1/2013 | Sapper et al. |
| 8,453,980 B2 | 6/2013 | Sapper et al. |
| 8,651,444 B2 | 2/2014 | Sapper et al. |
| 2005/0133678 A1 | 6/2005 | Dittmer |
| 2005/0284991 A1 | 12/2005 | Saez |
| 2005/0284997 A1 | 12/2005 | Tisbo et al. |
| 2006/0266909 A1 * | 11/2006 | Oddsen, Jr. ............ F16M 11/04 248/371 |
| 2008/0116622 A1 | 5/2008 | Fox |
| 2008/0237439 A1 | 10/2008 | Oddsen |
| 2010/0044541 A1 | 2/2010 | Sapper et al. |
| 2011/0303800 A1 * | 12/2011 | Sapper .................. F16M 11/10 248/70 |
| 2012/0112828 A1 | 5/2012 | Richter et al. |

FOREIGN PATENT DOCUMENTS

| | | |
|---|---|---|
| WO | 2007137905 A1 | 12/2007 |
| WO | 2008012368 A1 | 1/2008 |
| WO | 2008022873 A2 | 2/2008 |
| WO | 2008091998 A2 | 7/2008 |
| WO | 2008113860 A2 | 9/2008 |
| WO | 2009151760 A1 | 12/2009 |

* cited by examiner

SUPPORT APPARATUS FOR MULTIPLE DISPLAY DEVICES

CROSS-REFERENCE TO RELATED APPLICATIONS

The present application claims priority to U.S. Provisional Patent Application No. 61/983,603, which was filed on Apr. 24, 2014.

FIELD OF INVENTION

The present invention relates to supports for display devices such as monitors, liquid crystal displays, and other types of display devices.

BACKGROUND OF THE INVENTION

Support arms such as monitor supports often include one or more arms that extend from a support post. The arm is configured to hold an object, such as a monitor. The support post is typically clamped to a support surface, such as a desk, table or partition wall. Examples of support arms and similar support apparatuses are disclosed in U.S. Pat. Nos. 8,651,444, 8,453,980, 8,342,462, 7,652,876, 7,392,969, 7,389,965, 7,369,401, 7,252,277, 7,246,780, 7,182,301, 7,048,242, 7,014,157, 6,905,101, 6,863,252, 6,739,096, 6,702,604, 6,679,096, 6,554,238, 6,554,235, 6,505,988, 6,499,704, 6,343,006, 5,992,809, 5,772,174, 5,687,939, 5,553,820, D518,063, 4,844,387, and D537,323, U.S. Patent Application Publication Nos. 2013/0112828, 2011/0303800, 2010/0044541, 2005/0284997, 2005/0133678, 2005/0284991, 2006/0266909, 2008/0116622 and 2008/0237439, World Intellectual Property Publication Nos. WO 2009/151760, WO 2008/091998, WO 2008/113860, WO 2008/012368, WO 2008/022873, WO 2007/137905 and WO 2007/118862 and United Kingdom Patent Application No. GB 2,440,606.

Support apparatuses for monitors are often bulky, large objects when designed to hold multiple display devices. Such bulky, large designs are typically difficult to reposition for a user and can require a significant amount of space.

SUMMARY OF THE INVENTION

We have determined that a new design for support apparatuses is needed for supporting multiple display devices. Embodiments of the support apparatus for multiple display devices can include an arm assembly and a multiple display device holding assembly attached to the arm assembly. The multiple display device holding assembly can include an elongated member having an outer surface, a first end, a second end opposite the first end, and a central portion positioned between the first and second ends. The elongated member can also have at least one of: (i) at least one groove defined therein and (ii) at least one spline. The multiple display device holding assembly can also include a connector attaching the elongated member to the arm assembly where the connector is attached to the central portion of the elongated member. The multiple display device holding assembly can also include a first collar slideably attachable to the elongated member such that the first collar is slideable along the elongated member from adjacent the first end to adjacent the connector. The first collar can have at least one of: (a) at least one projecting member that extends into an opening of the first collar that is configured to receive the elongated member for slideable positioning within the at least one groove of the elongated member and (b) at least one aperture that is sized to receive the at least one spline of the elongated member such that the first collar is slideable along the at least one spline of the elongated member. The multiple display device holding assembly can also include a second collar slideably attachable to the elongated member such that the second collar is slideable along the elongated member from adjacent the second end to adjacent the connector. The second collar can have at least one of: (c) a projecting member that extends into an opening of the second collar that is configured to receive the elongated member for slideable positioning within the at least one groove of the elongated member and (d) at least one aperture that is sized to receive the at least one spline of the elongated member such that the second collar is slideable along the at least one spline of the elongated member.

For instance, some embodiments of the support apparatus can include an arm assembly that is supportable on a floor or on a work surface such as a desktop, tabletop, counter, or other work surface. The arm assembly can have an end that is pivotally attached to a connector element. The connector element can be connected to an elongated member having at least one groove defined in an outer surface of the elongated member. The connector element may be attached adjacent a rear central portion of the elongated member. A first collar may be attached to the elongated member adjacent a first end of the elongated member. A second collar can be attached to the elongated member adjacent a second end of the elongated member that is opposite the first end. The first collar can be slideable along the elongated member from adjacent the first end of the elongated member to adjacent the connector located adjacent the rear central portion of the elongated member. The second collar can also be slideable along the elongated member from adjacent the second end of the elongated member to adjacent the connector located adjacent the rear central portion of the elongated member.

In some embodiments, the connector may have a protuberance or at least one projection positioned within the at least one groove and the first and second collars may also each have at least one projection or protuberance within the at least one groove such that the at least one groove defines the path of travel for the first and second slideable collars. The connector can be positioned in the at least one groove such that the connector blocks movement of each of the first and second collars when they are positioned near the connector so that each collar cannot contact each other.

In some embodiments, each collar and the connector may have one or more fasteners such as a bolt, screw, or other fastener element that passes through the collar or connector and into the elongated member for affixation to of those elements to the elongated member. Each fastener may pass through holes formed in the elongated member that are in communication with the at least one groove. The holes may be bores or other types of holes that are sized to receive fasteners. Holes may be positioned at discrete spaced apart locations along the at least one groove of the elongated member to define discrete positions at which the first and second collars may be removably fastened to the elongated member after having been slid along the elongated member to that desired position between an end of the elongated member and a central portion of the elongated member at which the connector is attached so that the collars are not rotatable around the elongated member when fastened thereto.

Some embodiments of the support apparatus can include an arm assembly that is supportable on a floor or on a work surface such as a desktop, tabletop, counter, or other work surface. The arm assembly can have an end that is pivotally attached to a connector element. The connector element can be connected to an elongated member having at least one spline defined on or attached to an outer surface of the elongated member. The connector element may be attached adjacent a rear central portion of the elongated member. A first collar may be attached to the elongated member adjacent a first end of the elongated member. A second collar can be attached to the elongated member adjacent a second end of the elongated member that is opposite the first end. The first collar can be slideable along the elongated member from adjacent the first end of the elongated member to adjacent the connector located adjacent the rear central portion of the elongated member. The second collar can also be slideable along the elongated member from adjacent the second end of the elongated member to adjacent the connector located adjacent the rear central portion of the elongated member. For instance, the first and second collars may each have an aperture defined therein that is sized to receive the at least one spline of the elongated member for slideable attachment to the elongated member. For instance, a first collar can have a first aperture for receiving a first spline for slideable movement along the first spline and the second collar can have a second aperture for receiving a second spline for slideable movement along the second spline. As another example, a first collar can have a first aperture for being received in a first spline for slideable movement along the first spline and the second collar can have a second aperture for receiving the first spline for slideable movement along the first spline. In some embodiments, the aperture of each collar can be tapered or otherwise configured to provide a slideable attachment to the spline or a respective one of the splines of the elongated member so that the at least one spline of the elongated member defines the path of movement for the collars. The aperture of the first collar can be defined in an inner surface of the first collar that defines the opening of the first collar that is configured to receive the elongated member for slideable attachment to the elongated member and the aperture of the second collar can be defined in an inner surface of the second collar that defines the opening of the second collar that is configured to receive the elongated member for slideable attachment to the elongated member.

In other embodiments, the first and second collars can each have at least one projecting member for being received within at least one groove of the elongated member so that the at least one groove of the elongated member may define a path of travel of the collars. For instance, a first collar can have a first projecting member for being received in a first groove for slideable movement along the first groove and the second collar can have a second projecting member for being received in a second groove for slideable movement along the second groove. As another example, a first collar can have a first projecting member for being received in a first groove for slideable movement along the first groove and the second collar can have a second projecting member for being received in the first groove for slideable movement along the first groove. The first projecting member may extend inwardly away from the inner surface of the first collar that defines an opening that is sized and configured to receive the elongated member for slideable attachment to the elongated member such that the first projecting member extends into the opening defined by the inner surface of the first collar. The second projecting member may extend inwardly from the inner surface of the second collar that defines an opening that is sized and configured to receive the elongated member for slideable attachment to the elongated member such that the second projecting member extends into the opening defined by the inner surface of the second collar.

In some embodiments, the support apparatus can be configured with locking mechanisms for the collars of the support apparatus. For instance, a first locking mechanism can be connectable to a first collar and the elongated member. The first locking mechanism can be moveable to and from a locked position and an unlocked position. The first locking mechanism can include a first fastener such as a screw or bolt. The first collar can be immovably affixable to the elongated member by the first fastener extending through a hole of the first collar and also extending through a hole of the elongated member that is in communication with a groove of the elongated member when the first locking mechanism is in the locked position to lock a position of the first collar on the elongated member. The first fastener can be positioned out of the hole of the elongated member when the first locking mechanism is in the unlocked position such that the first collar is slideable along the elongated member when the first locking mechanism is in the unlocked position. A second locking mechanism can be connectable to the elongated member and the second collar. The second locking mechanism can be moveable from a locked position to an unlocked position. The second locking mechanism can include a second fastener such as a bolt or screw. The second collar can be immovably affixable to the elongated member by the second fastener extending through a hole of the second collar and also extending through a hole of the elongated member that is in communication with the groove when the second locking mechanism is in the locked position to lock a position of the second collar on the elongated member. The second fastener can be positioned out of the hole of the elongated member when the second locking mechanism is in the unlocked position such that the second collar is slideable along the elongated member when the second locking mechanism is in the unlocked position. Of course, in other embodiments locking mechanisms may not be used in connection with the collars.

The arm assembly of the support apparatus can have any number of configurations. For example, the arm assembly may include multiple linkages that are each pivotally attached together. The arm assembly can also include a gas spring or other type of counterbalance mechanism that is positioned between at least two different arm members of the arm assembly. The gas spring may be attached to a force adjustment mechanism that permits the force exerted by the gas spring to be adjusted by movement of an end of the gas spring attached to one of the arm members. An example of such an adjustment mechanism is disclosed in our U.S. Pat. No. 8,777,172 and U.S. Patent Application Publication No. 2013/0306820.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of support apparatus for supporting multiple display devices are shown in the accompanying drawings and certain exemplary methods of practicing the same are also illustrated therein. It should be appreciated that like reference numbers used in the drawings may identify like components.

DETAILED DESCRIPTION OF EXEMPLARY EMBODIMENTS

Referring to FIGS. 1-9, a support apparatus for multiple display devices includes an arm assembly 5 that has an upwardly projecting first arm member 5a that is attached to a proximate end of a second arm member 5b. The upwardly projecting first arm member 5a may be rotatable relative to clamping device 3 or other type of mounting device to which the upwardly projecting arm member 5a may be attached. The second arm member 5b can be rotatably and pivotally attached to a third arm member 5c adjacent a distal end of the second arm member 5b that is opposite its proximate end such that the third arm member 5c is rotatable relative to the second arm member 5b and is also pivotal relative to the second arm member 5b.

Figure 1:
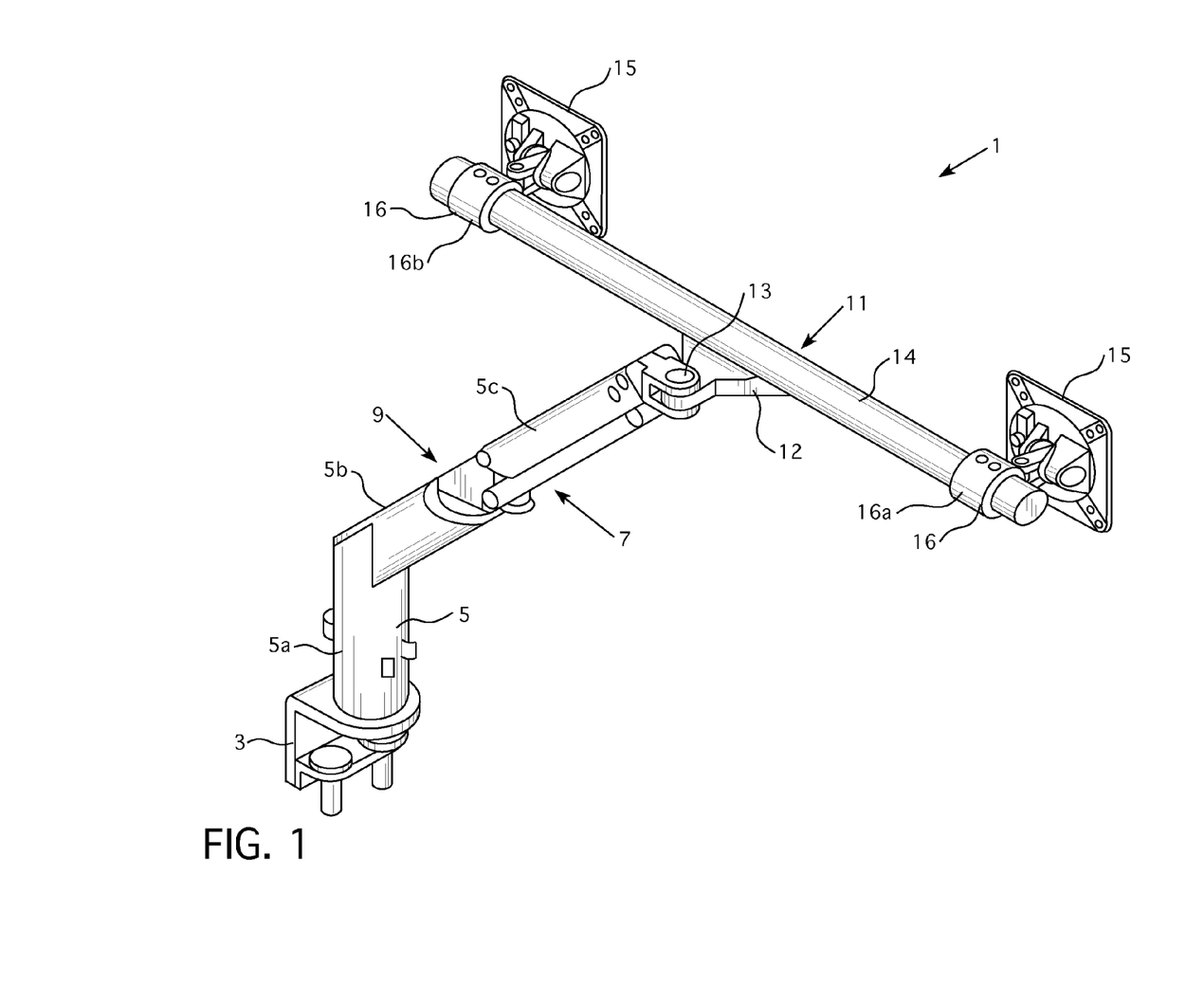
FIG. 1 is a rear perspective view of a first exemplary embodiment of the support apparatus for supporting multiple display devices.
Figure 2:
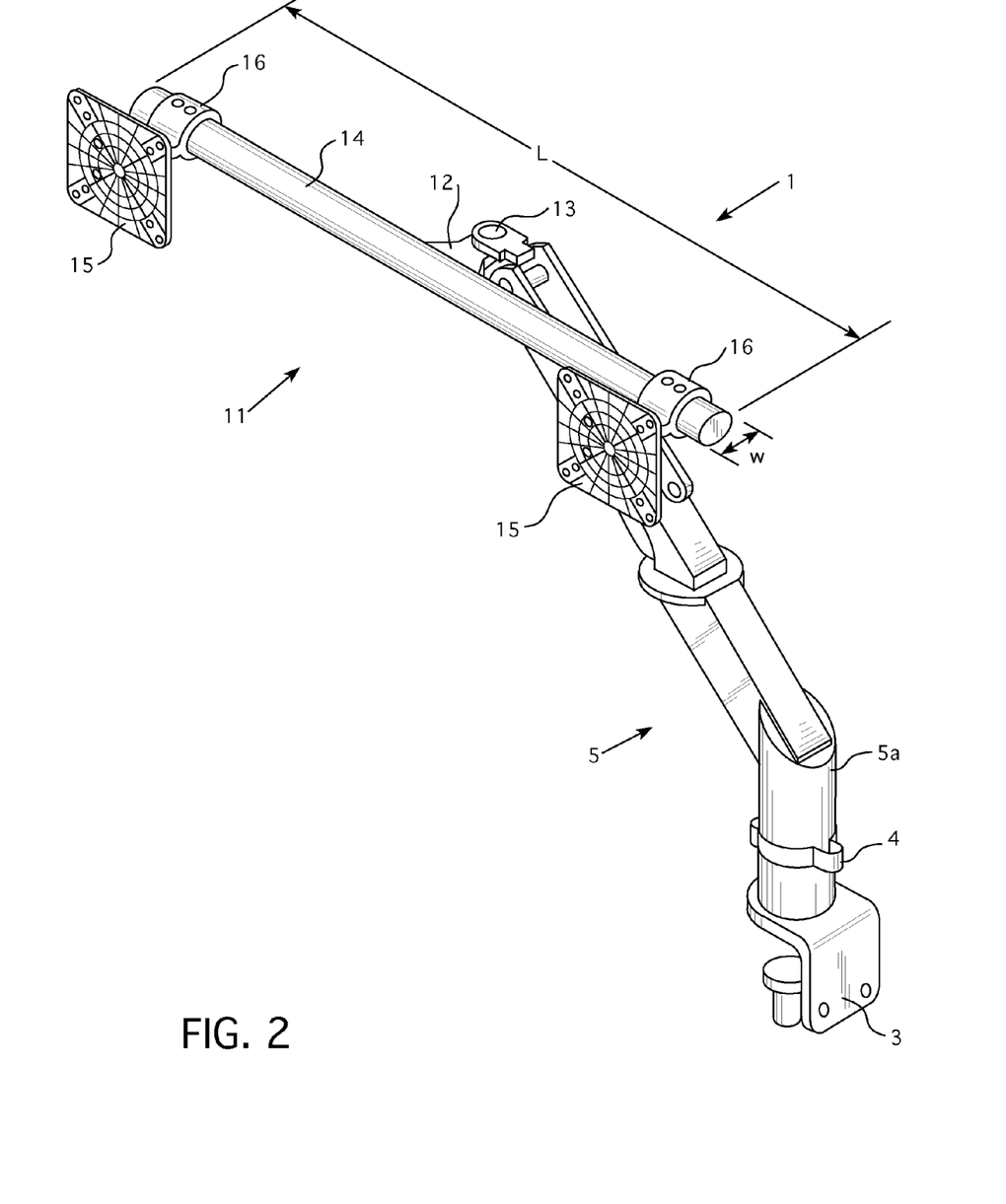
FIG. 2 is a front perspective view of the first exemplary embodiment of the support apparatus for supporting multiple display devices.
Figure 3:
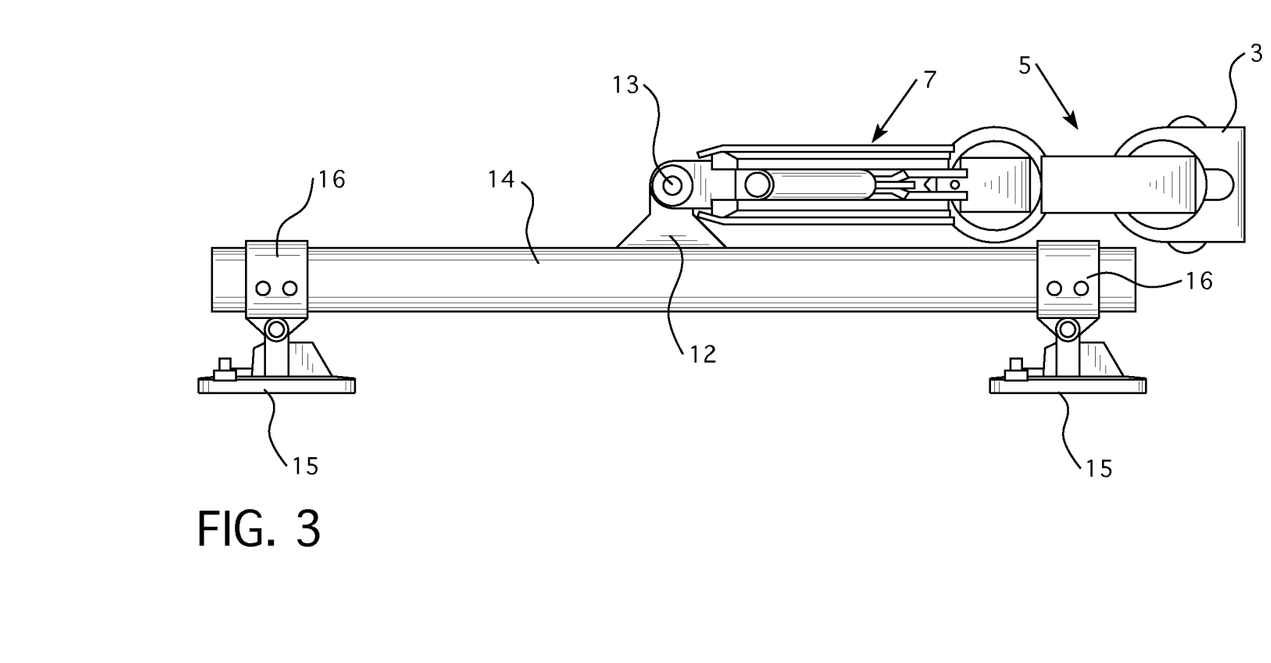
FIG. 3 is a top view of the first exemplary embodiment of the support apparatus for supporting multiple display devices.

A gas spring 7 can be attached between an end of the second arm member 5b and a distal end of the third arm member 5c. The gas spring 7 or other type of counterbalance mechanism (e.g. a hydraulic spring, another type of spring mechanism, etc.) can be configured to maintain a position of the third arm member 5c in any of a number of different pivoted orientations. A connector assembly 9 may connect the second arm member 5b to the third arm member 5c. The end of the gas spring 7 attached adjacent to the distal end of the second arm member 5b can be directly attached to this connector assembly 9. The connector assembly can be configured to permit the end of the gas spring attached thereto to be vertically adjusted to adjust a force exerted by the gas spring for maintaining the position of the third arm member 5c throughout a range of motion and across a range of weights or masses (e.g. a range of preselected weights or masses such as a range of masses of 1 kg to 25 kg). The gas spring positioning can be adjusted to permit the arm assembly to support the weight of a number of display devices and maintain their position in any of a number of different orientations and positions while also permitting a user to easily adjust the position of the display devices by providing a force to move the arm assembly to a new orientation or location for a change in vertical and/or horizontal positioning of the display devices supported by the arm assembly. In some configurations, a user may be able to easily adjust the positioning of the arm assembly by use of a single finger or a hand.

The connector assembly 9 can include the vertically adjustable attachment mechanism disclosed in our U.S. Pat. No. 8,777,172 and U.S. Patent Application Publication No. 2013/0112828 (the entirety of U.S. Patent Application Publication No. 2013/0112828 is incorporated by reference herein). A mechanical tool such as an Allen wrench, hex wrench, screwdriver, or other type of mechanical tool can be removeably attachable to an element of the support apparatus for being used to engage a rotatable member of the vertically adjustable attachment mechanism of the connector assembly for effecting an adjustment of the vertical location at which an end of the gas spring 7 is attached to the connector assembly for adjusting the force exerted by the gas spring for maintaining the position of the third arm 5c at any of a number of different selectable positions.

The third arm member 5c may be moved to any number of different selectable positions by a user exerting a force on the third arm member 5c to cause the third arm member 5c to pivot to a vertically lower or higher position. A user can also exert a force of the third arm member 5c to cause the third arm member 5c to rotate relative to the second arm member 5b. Rotation and pivoting of the third arm member 5c can adjust a position of monitors or other types of display devices supported by the third arm member 5c.

A connector 12 can be pivotally attached to the distal end of the third arm member 5c. An axle 13, such as a pin, screw, bolt, or other member can be positioned through a hole 12a formed in a rear of the connector 13 as well at least one aperture defined in the third arm member 5c for pivotally connecting the connector to the third arm member 5c such that the connector 12 is rotatable about an axis defined by the axle 13. A front end of the connector 12 can be attached to an elongated member 14 of a multiple display device holding assembly 11. The multiple display device holding assembly 11 may also include multiple moveable collars 16 such as a first collar 16a and a second collar 16b that are moveably attached to the elongated member 14 at opposite ends of the elongated member. For some embodiments, additional collars 16 can also be attached to the opposite sides of the elongated member 14 (e.g. a third collar, a fourth collar, etc.)

Figure 4:
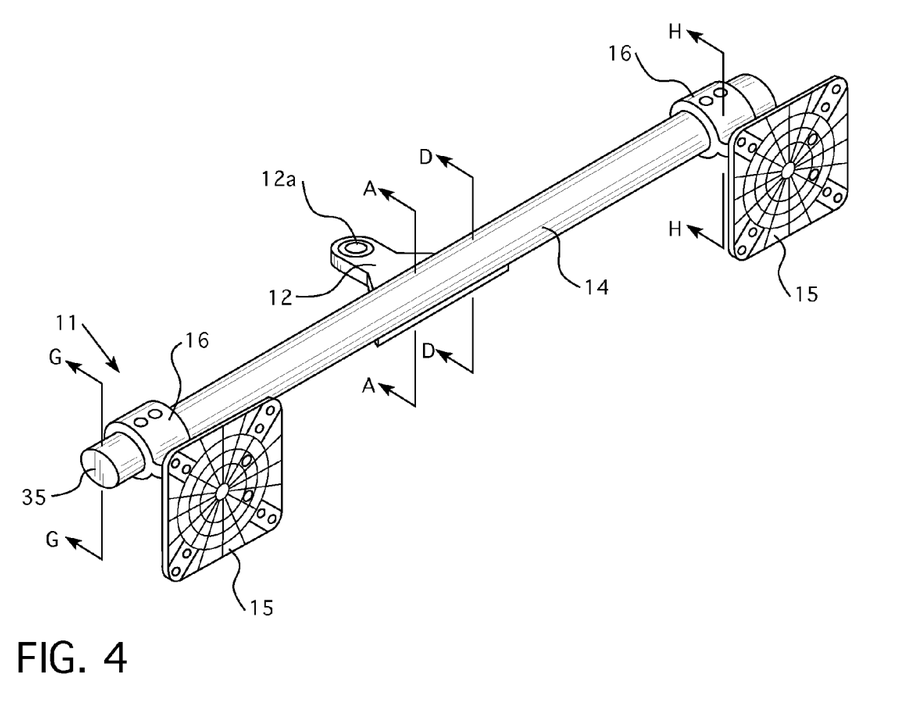
FIG. 4 is a front perspective view of the multiple display device holding assembly 11 of the first exemplary embodiment of the support apparatus for supporting multiple display devices.
Figure 5:
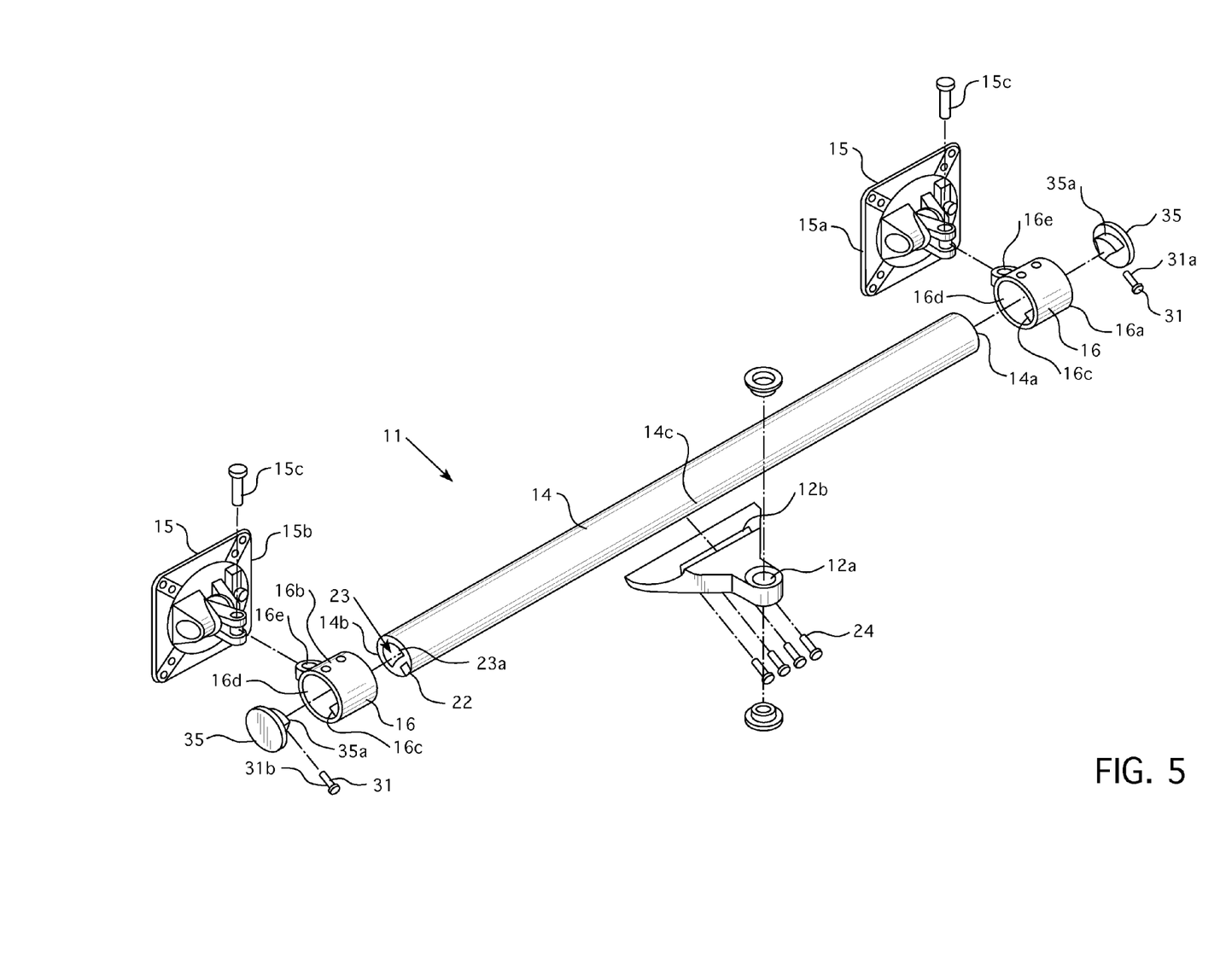
FIG. 5 is an exploded view of the multiple display device holding assembly 11 of the first exemplary embodiment of the support apparatus for supporting multiple display devices.
Figure 6:
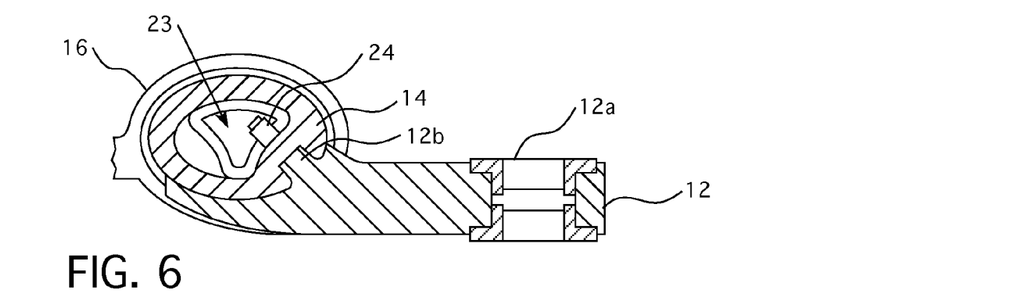
FIG. 6 is a cross sectional view of the multiple display device holding assembly 11 of the first exemplary embodiment of the support apparatus for supporting multiple display devices taken along line A-A shown in FIG. 4.
Figure 7:
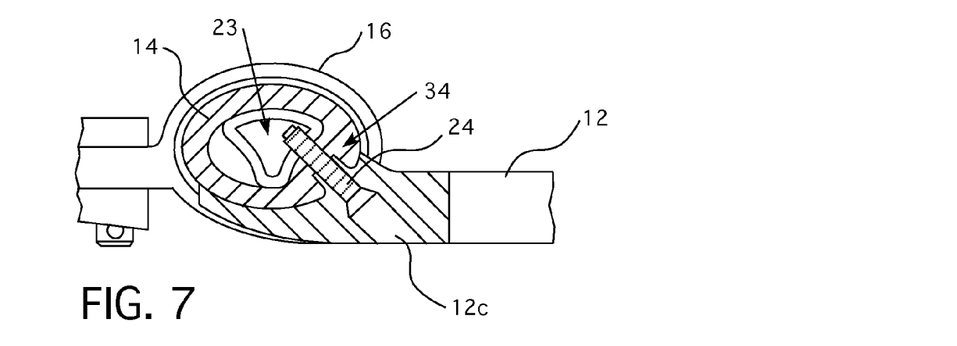
FIG. 7 is a cross sectional view of the multiple display device holding assembly 11 of the first exemplary embodiment of the support apparatus for supporting multiple display devices taken along line D-D shown in FIG. 4.
Figure 8:
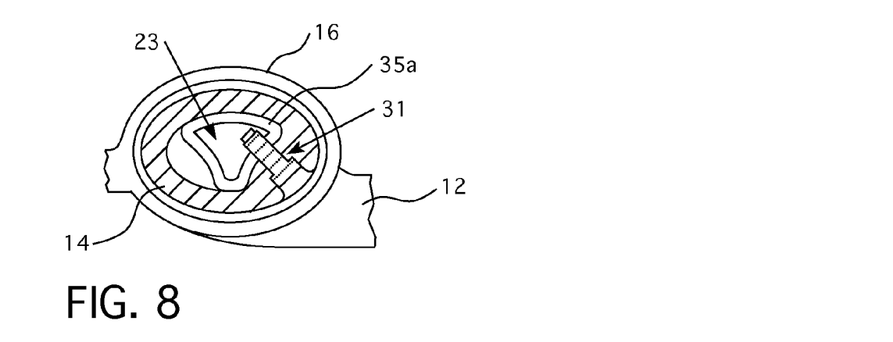
FIG. 8 is a cross sectional view of the multiple display device holding assembly 11 of the first exemplary embodiment of the support apparatus for supporting multiple display devices taken along line G-G shown in FIG. 4.
Figure 9:
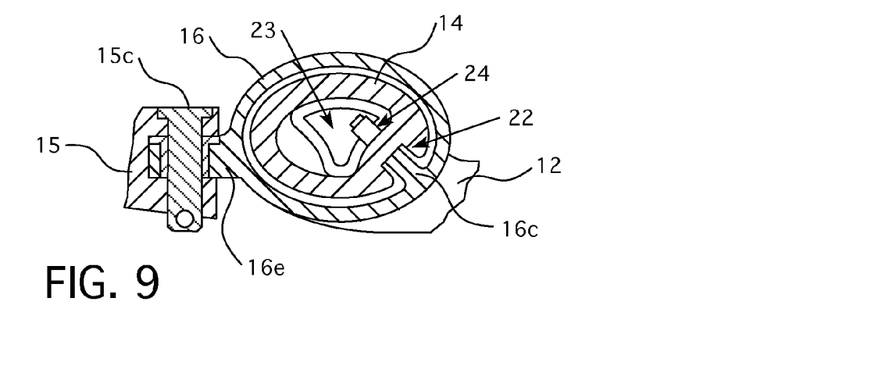
FIG. 9 is a cross sectional view of the multiple display device holding assembly 11 of the first exemplary embodiment of the support apparatus for supporting multiple display devices taken along line H-H shown in FIG. 4.

The multiple display device holding assembly 11 can also include display device mounting devices 15 that can be pivotally attached to the collars 16. For instance, a first display device mounting device 15a can be pivotally attached to the first collar 16a and a second display device mounting device 15b can be pivotally attached to the second collar 16b. Each display device mounting device 15 can be pivotally attached to a front portion 16e of a collar 16 such that the mounting devices 15 are horizontally pivotal about a vertical axle 15c located adjacent a front of the elongated member 14. The vertical axle 15c can be a pin, bolt, or other type of axle element that is positioned through at least one aperture of the mounting device 15 and at least one aperture of the front portion 16e of the collar 16 for pivotally attaching the collar 16 to the mounting device 15. The display device mounting devices 15 can each also be configured to attach to a display device such that the display is swivelable and is also able to rotate about a plate of the display device mounting devices, and tilt vertically about a horizontal axle attached to the display device mounting device 15.

The elongated member 14 can be a rod, an elongated generally cylindrical structure, an elongated bar, an elongated beam or other type of elongated member. For instance, the elongated member 14 can be an elongated member having a polygonal cross-section, circular cross-section, or an oval cross-section. As another example, the elongated member may be a linearly extending member or a member that extends along a curve or that has one or more angled portions. The elongated member may be a solid member or may define one or more cavities therein or other spaces that permit portions of the elongated member to be hollow. For example, the elongated member could be configured to include an inner central channel 23 that is defined within the elongated member 14. The central channel 23 can extend from the first end 14*a* of the elongated member 14 to the second end 14*b* of the elongated member 14. As another example, first and second ends 14*a* and 14*b* of the elongated member 14 can have an aperture 23*a* defined therein that is sized to matingly receive a projection 35*a* of an end cap 35 that is to be attached to that end of the elongated member.

The elongated member 14 may be elongated so that it has a length L. The elongated member 14 can also have a width W. When the elongated member has a circular cross-section (e.g. is cylindrical in shape), the width W may be the diameter of the elongated member 14.

The elongated member 14 can also have at least one groove 22 that extends from adjacent a first end of the elongated member to adjacent the second end of the elongated member. For instance, the elongated member 14 can have one continuous groove 22 or the elongated member can have two or more grooves 22 such as a first groove that extends from adjacent a first end 14*a* to adjacent a rear central portion 14*c* of the elongated member and a second groove that extends from adjacent a second end 14*b* of the elongated member to adjacent the rear central portion 14*c* of the elongated member. For embodiments that include two grooves, the grooves may be separated from each other by a central portion of the elongated member that does not have any type of groove or aperture so that the two grooves are not in communication with each other. Each groove 22 may be any type of elongated aperture such as, for example, a channel, an elongated depression, an elongated recess, a furrow, or a trench formed or defined in the outer surface of the elongated member. Each groove 22 can be formed or defined on the rear side of the elongated member, the top of the elongated member, or on the bottom of the elongated member. In some embodiments, it is contemplated that the groove could also be defined or formed on the front side of the elongated member 14.

For embodiments that are configured so that the elongated member only has one continuous groove 22 that extends from adjacent the first end 14*a* of the elongated member 14 to adjacent the second end 14*b* of the elongated member 14, the connector 12 can include at least one protuberance, elongated finger, or other type of projection element 12*b* that is sized for being positioned within the groove 22 at the central portion 14*c* of the elongated member adjacent the rear side of the elongated member. The one or more projection elements 12*b* can be positioned in the central portion of the groove 22 to block the central portion of the groove 22 and help prevent a collar 16 from being slid along the elongated member 14 from adjacent one end of the elongated member to a position on the opposite end by preventing the collar from passing through the central portion of the groove 22. Such a positioning of the connector 12 can help avoid accidents when the support apparatus is being used by a user. For instance, such a positioning of the connector can be configured to help avoid monitors or other display devices being positioned by a user along the elongated member 14 so that too much weight is off center on the same side, which could create an unintended imbalance of weight that may result in instability of the support apparatus.

Each collar 16 may include a body having a generally annular structure. For instance, each collar 16 may include a body that is generally ring shaped or is a polygonal shaped structure having a central opening 16*d* or channel defined within the center of the collar 16. The central opening 16*d* of each collar 16 can be a channel or other type of aperture that is sized to permit the collar 16 to encircle the outer surface of the elongated member 14 for attachment on the elongated member 14. Each collar 16 can include at least one projection, protuberance, finger or other type of projecting member 16*c* that is sized and configured to be matingly fit within the groove 22 of the elongated member. The projecting member 16*c* can be positioned on a rear of the collar 16 and can project inwardly into an inner central opening 16*d* of the collar 16. Alternatively, the projecting member 16*c* can be positioned on the top, bottom, or front of the collar and be configured to project inwardly for engagement with a groove on the top, bottom, or front of the elongated member 14 for embodiments of the elongated member 14 having such a groove.

The projecting member 16*c* of each collar 16 can be sized and configured to permit the collar 16 to be slid along the elongated member by a path defined by the groove 22 when the projecting member 16*c* is inserted within the groove 22 such that the groove 22 can define the path of travel along which the collar 16 is slideable when attached to the elongated member 14. If the groove is linear, the path may be linear. If the groove is curved, the defined path may include at least one curve.

Each collar 16 can also include a front portion 16*e* that has a hole or other type of aperture defined therein that is sized to receive a vertical axle 15*c* for pivotally connecting with a display device mounting device 15 so that the display device mounting device 15 is pivotally attached to the collar 16 adjacent a front side of the elongated member 14 that is opposite its rear side that has the groove 22.

Each of the display device mounting devices 15 can be configured to be attached to a display device for holding a display device such that the display device is rotatable about a plate of the display device mounting device 15 as well as vertically tiltable about a horizontal axle of the display device mounting device 15. A friction lock mechanism may engage such a horizontal axle or be otherwise connected to such a horizontal axle for maintaining a vertically tilted position of the display device.

The elongated member 14 may also include a plurality of holes that are formed therein or defined therein that are in communication with the groove 22. The holes can be configured as bores or other types of holes that may extend from the groove 22 to a middle portion of the elongated member 14. For instance, there may be holes that are defined in the elongated member 14 that are spaced apart from each other. Each hole can extend from the groove 22 to an inner central portion of the elongated member 14 and can be configured to receive a fastener, such as a screw or bolt. The internal surface of the elongated member 14 that defines each hole can define threads or grooves for facilitating the receipt of a fastener therein for attachment of that fastener to the elongated member 14.

In some embodiments, the holes can be arranged along the groove 22 and may be spaced apart from each other along the length L of the elongated member so that each hole can define a discrete position along the groove at which a collar 16 can be slid to for releaseable immovable affixation to the elongated member 14 via a fastener that may be passed through a hole in the collar 16 and into a hole of the elongated member for affixation of the collar 16 to the elongated member 14 to lock the position of the collar 16 on the elongated member. When the fastener is inserted into the collar 16 for fastening the collar 16 to the elongated member 14, an end portion of the fastener can engage a body of the collar and another portion of the fastener may engage the body of the elongated member 14 for fastening the collar 16 to the elongated member 14. The fastener can subsequently be removed from the collar 16 to unlock the collar 16 and permit the collar 16 to be moveable along the elongated member 14 to a new position prior to having the fastener again passed through the collar and into the hole associated with that new position. For such embodiments, each fastener can be considered a locking mechanism or a component of a locking mechanism that is configured for locking a position of the collar 16 on the elongated member when the locking mechanism is in a locked position. When the fastener is removed from the elongated member 14, the locking mechanism can be in an unlocked position so that the collar is slideable along the elongated member. When the fastener is inserted through the collar 16 and the elongated member 14, the lock mechanism may be in a locked position for locking the location of the collar by immovably affixing the collar to the elongated member to prevent sliding of the collar along the elongated member until the lock mechanism is moved to the unlocked position.

It should be understood that embodiments of the support apparatus can be configured to include a locking mechanism for each collar 16. For instance, the support apparatus can have a first locking mechanism that includes a first fastener that is insertable and removable from the first collar 16a and the elongated member and a second locking mechanism that includes a second fastener that is insertable and removable from the second collar 16b and the elongated member 14. Each fastener of the locking mechanism can be a bolt, screw or other type of rotatable fastener that is able to be repeatedly inserted into a collar and the elongated member and removed from the collar and the elongated member.

In some embodiments, there may also be holes 34 that are positioned in the rear of the elongated member 14 that extend from the rear of the elongated member 14 to an inner central portion of the elongated member 14 for receipt of fasteners 24 that may be inserted into the body of the connector 12 and passed through the holes 34 for fastening of the connector 12 to the elongated member 14. The holes 34 can be in communication with the groove 22 so that the holes 34 extend between the groove 22 and the inner central channel 23 of the elongated member 14. The fasteners 24 can be bolts, screws or other type of fasteners that can be inserted into holes 12c in the connector 12 so that end portions of the fasteners 24 are insertable into the holes 34 of the elongated member 14 for fastening the connector 12 to the elongated member 14. The internal surfaces of the elongated member 14 that defines the holes 34 can also define threads, protuberances, or other structure for facilitating the insertion of fasteners and connection to the fasteners 24 inserted into the holes 34 for fastening the elongated member 14 to the connector 12. The holes 34 may be formed in the elongated member 14 so that the holes 34 are located in a central rear portion of the outer surface of the elongated member 14.

Assembly of the support apparatus so that multiple display devices such as computer monitors, liquid crystal displays, electronic tablets, or other types of display devices can be supported adjacent a work surface for a user can occur in a relatively quick and easy manner. For instance, a clamping device 3 attached to the base of the arm assembly 5 can clamp the arm assembly onto a work surface. A manufacturer may provide the arm assembly 5 such that the arm assembly 5 is already attached to the gas spring 7 and the connector 12 and so that the connector 12 is already fastened to the elongated member 14 via the fasteners 24 such that the projection element 12b is within the central portion of the groove 22 of the elongated member 14. The first and second collars 16 may be positioned on the first and second end portions of the elongated member 14 by a user so that their projecting members 16c mate within the groove 22. Each of the collars 16 may be slid from the end to which that collar 16 is positioned toward a central area of the elongated member 14 adjacent the connector 12 to position the collar 16 where desired to one of the discrete location defined by one of the holes formed in the elongated member 14 that is in communication with the groove 22.

End caps 35 can be attached to the first and second ends 14a and 14b of the elongated member 14 and be sized to prevent the collars 16 from sliding off the ends of the elongated member 14. For instance, a first end cap 35 can have a projection 35a that is sized to mate within an aperture formed in the first end 14a of the elongated member 14 for attachment of the end cap 35 to the first end 14a of the elongated member to block sliding motion of a collar off the first end 14a. Fasteners 31 can also be utilized to affix the end caps 35 to the ends of the elongated member 14. For example, a first fastener 31 can also be passed through a portion of the end cap 35 and into the elongated member 14 to attach the first end cap 35 to the first end 14a of the elongated member 14. The first fastener 31 can be a screw, a bolt, a nail, a rivet, or other type of fastener. A second end cap 35 can be attached to the second end 14b of the elongated member 14 to block sliding motion of a collar off the second end 14b. The second end cap can also include a projection 35a that mates within an aperture 23a that is defined in the second end 14b of the elongated member 14. A second fastener 31b can also be passed through the end cap and the elongated member to affix the end cap to the second end of the elongated member. The second fastener 31b can be the same type of fastener as the first fastener 31a. In alternative embodiments, the ends of the elongated member may have projections 42 as shown in broken line in FIG. 10 that mate within apertures defined in the end caps to receive those projections 42 for interlocking the end caps 35 to the ends of the elongated member 14.

A mounting device 15 may then be attached to a respective one of the collars 16. Alternatively, each mounting device 15 can be preassembled as being pivotally attached to each collar 16 so that a user need only position the collars 16 where desired on the elongated member and affix the collars to those locations. Display devices may then be mounted onto the mounting devices. The support apparatus may then support the multiple display devices.

Figures 10, 11:
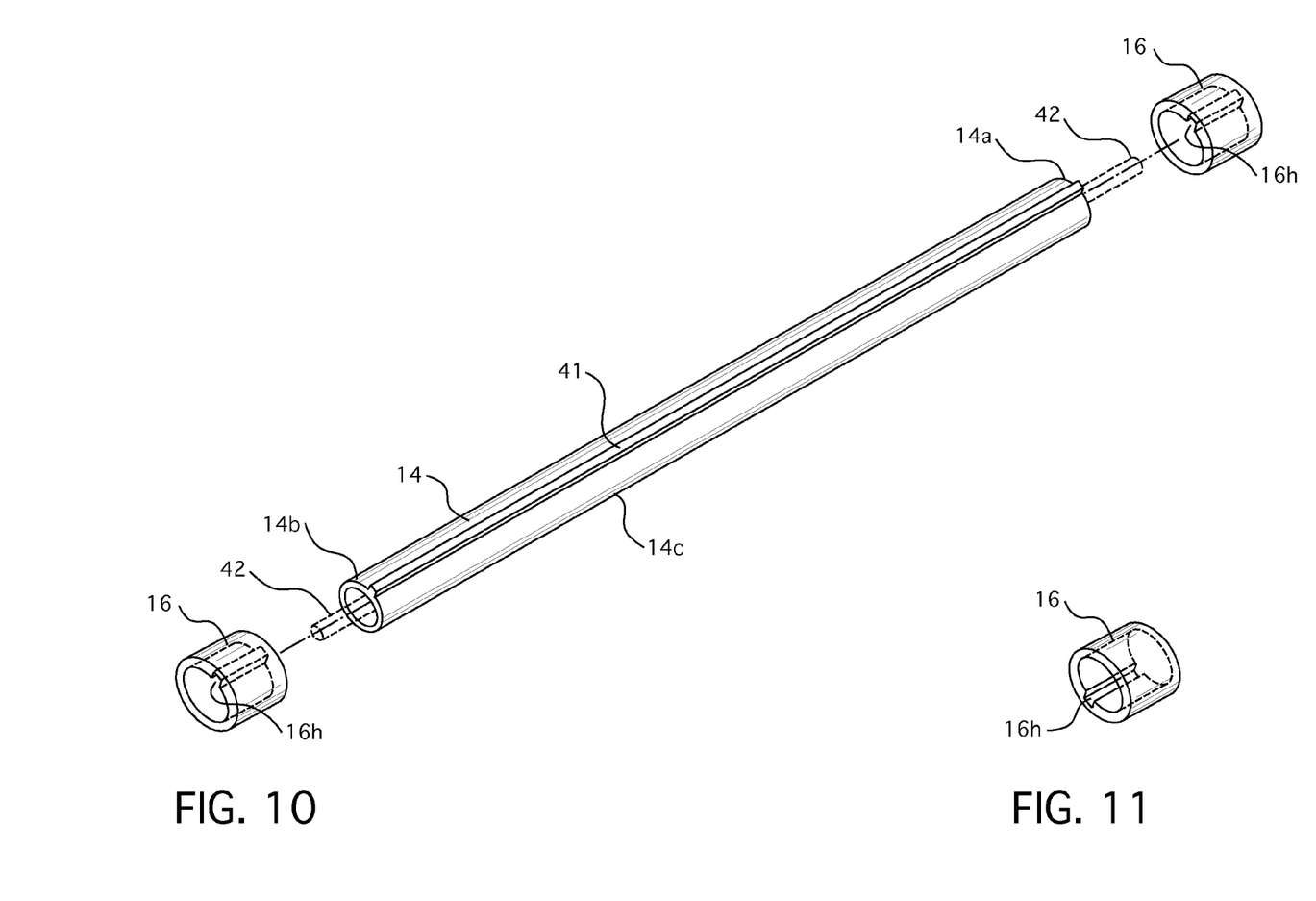
FIG. 10 is an exploded fragmentary view of an exemplary embodiment of an elongated member 14 and an exemplary embodiment of a collar 16 that can be utilized in embodiments of the multiple display device holding assembly of a support apparatus for supporting multiple display devices. Projections 42 and apertures 16h are illustrated in broken line in FIG. 10.
FIG. 11 is a perspective view of the exemplary embodiment of the collar illustrated in FIG. 10.

As can be appreciated from FIGS. 10 and 11, the elongated member 14 and the collars 16 of the multiple display devices holding assembly 11 can be sized and configured in other arrangements. For example, the elongated member 14 can include at least one spline 41 instead of at least one groove 22 and the collars 16 can each include an aperture 16h such as a tapered recess or tapered groove that is sized to receive the spline 41 for slideable attachment of the collars 16 to the elongated member 14. The collar 16 can be configured so that the portion of the collar 16 defining such an aperture includes teeth, protuberances, or other type of projecting portions that resiliently grip the spline 41 when the spline is inserted therein for slideable attachment of the collar 16 to the elongated member 14.

The spline 41 can be configured as a relatively narrow strip of material that is formed or attached to the elongated member 14. For instance, the spline 41 can be an elongated protuberance that is formed on the elongated member or attached to the elongated member. For instance, the spline 41 could be formed on the elongated member 14 by welding it to the elongated member, adhering it to the elongated member or by casting or otherwise molding the elongated member so that it has the spline 41. As another example, the spline 41 could be attached to the elongated member via molding, fasteners, or use of an adhesive.

The collar 16 can have an inner surface defining an inner channel that is sized to receive the elongated member 14. The aperture 16h can be defined in the inner surface of the collar 16 to define the aperture 16h.

It should be appreciated that additional modifications to the support apparatus can be made to meet different sets of design criteria. For instance, more than two collars 16 can be attached to the elongated member 14. As another example, one end of the elongated member 14 may have two or more collars and the other end may only have one collar or may also have two or more collars. As yet another example, embodiments of the support apparatus can be configured so that the elongated member 14 includes at least one spline 41 and at least one groove 22 and each collar has at least one aperture defined along an inner surface of the collar for receiving a spline 41 of the elongated member 14 (e.g. a respective spline or the same spline as received by other collars) and at least one projecting member that projects inwardly away from the inner surface of the collar and into the central opening 16d for being positioned in a groove 22 of the elongated member 14 (e.g. a respective groove 22 or the same groove that facilitates slideable connection for other collars). As yet another example, embodiments of the support apparatus may not include a vertically adjustable attachment mechanism for connecting an end of the gas spring 7 to an arm member of the arm assembly. As yet another example, fasteners may not be needed for affixing the collars 16 onto the elongated member 14. Instead, the collar and projecting member 16c can be sized and configured to permit the collars to be slideably attached to the elongated member 14 without having to be immovably affixed thereto for support of a display device on the elongated member 14. As yet another example, the connector 12 can be configured as an integral component of the arm assembly 5 or as a central portion of the elongated member 14. As yet another example, the support apparatus can include one or more cord management assemblies 4 attached to the arm assembly 5 to provide cord management for power cords, communication connectors, and other cords or wires. As yet another example, it is contemplated that the base of the support apparatus can be weighted such that the arm assembly can be configured to stand on the ground or stand on a work surface without need of a clamping device 3 for mounting of the support apparatus to a work surface. As yet another example, the support apparatus can be configured for attachment to a mounting device so that the support apparatus is attachable to a vertical surface (e.g. a wall, a pole, etc.). The support apparatus can also be configured such that the elongated member is connectable to different display mounting devices via the collars 16 or is connectable to different sized display devices so that multiple different types of display devices are slidably connected to the elongated member 14 via the collars 16.

Therefore, it should be understood that while certain exemplary embodiments of support apparatuses for display devices and methods of making and using the same have been discussed and illustrated herein, it is to be distinctly understood that the invention is not limited thereto but may be otherwise variously embodied and practiced within the scope of the following claims.

What is claimed is:

1. A support apparatus for multiple display devices, comprising:
    an arm assembly; and
    a multiple display device holding assembly attached to the arm assembly, the multiple display device holding assembly comprising:
        an elongated member having an outer surface, a first end, a second end opposite the first end, and a central portion positioned between the first and second ends, the elongated member also having at least one groove defined therein;
        a connector attaching the elongated member to the arm assembly, the connector attached to the central portion of the elongated member,
        a first collar slideably attachable to the elongated member such that the first collar is slideable along the elongated member from adjacent the first end to adjacent the connector, the first collar having at least one projecting member that extends into an opening of the first collar that is configured to receive the elongated member for slideable positioning within the at least one groove of the elongated member; and
        a second collar slideably attachable to the elongated member such that the second collar is slideable along the elongated member from adjacent the second end to adjacent the connector, the second collar having at least one projecting member that extends into an opening of the second collar that is configured to receive the elongated member for slideable positioning within the at least one groove of the elongated member; and
    wherein the connector is positioned on the central portion of the elongated member to block motion of the first and second collars such that the first collar is prevented from sliding along the elongated member past the central portion of the elongated member and the second collar is prevented from sliding along the elongated member past the central portion of the elongated member; and
    a gas spring attached to the arm assembly; and wherein the first collar has an annular structure defining the opening within an entirety of the annular structure of the first collar and the second collar has an annular structure defining the opening of the second collar within an entirety of the annular structure of the second collar.

2. The support apparatus of claim 1 wherein the at least one groove is a single groove on a rear side of the elongated member.

3. The support apparatus of claim 1 wherein the connector has at least one projection element that is matingly engaged in the groove to block motion of the first collar along the elongated member and to block motion of the second collar along the elongated member.

4. The support apparatus of claim 3 wherein the connector is attached to the elongated member by at least one fastener that extends from the connector to the elongated member.

5. The support apparatus of claim 1 wherein the arm assembly is comprised of a first arm member, a second arm member and a third arm member, and a connector assembly, the first arm member attached to the second arm member, the connector assembly rotatably and pivotally connecting the second arm member to the third arm member.

6. The support apparatus of claim 1 wherein the multiple display device holding assembly is also comprised of a first end cap attached to the first end of the elongated member and a second end cap attached to the second end of the elongated member.

7. A support apparatus for multiple display devices, comprising:
an arm assembly; and
a multiple display device holding assembly attached to the arm assembly, the multiple display device holding assembly comprising:
an elongated member having an outer surface, a first end, a second end opposite the first end, and a central portion positioned between the first and second ends, the elongated member also having at least one groove defined therein;
a connector attaching the elongated member to the arm assembly, the connector attached to the central portion of the elongated member,
a first collar slideably attachable to the elongated member such that the first collar is slideable along the elongated member from adjacent the first end to adjacent the connector, the first collar having at least one projecting member that extends into an opening of the first collar that is configured to receive the elongated member for slideable positioning within the at least one groove of the elongated member; and
a second collar slideably attachable to the elongated member such that the second collar is slideable along the elongated member from adjacent the second end to adjacent the connector, the second collar having at least one projecting member that extends into an opening of the second collar that is configured to receive the elongated member for slideable positioning within the at least one groove of the elongated member; and
wherein the connector is positioned on the central portion of the elongated member to block motion of the first and second collars such that the first collar is prevented from sliding along the elongated member past the central portion of the elongated member and the second collar is prevented from sliding along the elongated member past the central portion of the elongated member; and
wherein the first collar has an annular structure defining the opening within an entirety of the annular structure of the first collar the second collar has an annular structure defining the opening of the second collar within an entirety of the annular structure of the second collar; and
wherein the arm assembly is comprised a first arm member attached to a second arm member and a second arm member that is pivotally and rotatably attached to a third arm member.

8. The support apparatus of claim 7 further comprising a clamp device attached to the arm assembly.

9. The support apparatus of claim 7 wherein the connector is attached to the third arm member.

10. The support apparatus of claim 9 wherein the arm assembly is also comprised of a connector assembly that rotatably and pivotally connects the second arm member to the third arm member.

11. The support apparatus of claim 6 wherein the first end cap has one of a projection and an aperture and the second end cap has one of a projection and an aperture.

12. The support apparatus of claim 6 wherein the first and second end caps are sized and configured to prevent the collars from being slid off the elongated member.

13. A support apparatus for multiple display devices, comprising:
an arm assembly; and
a multiple display device holding assembly attached to the arm assembly, the multiple display device holding assembly comprising:
an elongated member having an outer surface, a first end, a second end opposite the first end, and a central portion positioned between the first and second ends, the elongated member also having at least one groove defined therein;
a connector attaching the elongated member to the arm assembly, the connector attached to the central portion of the elongated member,
a first collar slideably attachable to the elongated member such that the first collar is slideable along the elongated member from adjacent the first end to adjacent the connector, the first collar having at least one projecting member that extends into an opening of the first collar that is configured to receive the elongated member for slideable positioning within the at least one groove of the elongated member; and
a second collar slideably attachable to the elongated member such that the second collar is slideable along the elongated member from adjacent the second end to adjacent the connector, the second collar having at least one projecting member that extends into an opening of the second collar that is configured to receive the elongated member for slideable positioning within the at least one groove of the elongated member; and
wherein the connector is positioned on the central portion of the elongated member to block motion of the first and second collars such that the first collar is prevented from sliding along the elongated member past the central portion of the elongated member and the second collar is prevented from sliding along the elongated member past the central portion of the elongated member; and
wherein the first collar has an annular structure defining the opening within an entirety of the annular structure of the first collar and the second collar has an annular structure defining the opening of the second collar within an entirety of the annular structure of the second.

14. The support apparatus of claim 13 wherein the at least one projecting member of the first collar contacts the elongated member within a groove of the elongated member such that the first collar is slideable along the elongated member along a path of movement defined by that groove; and
the at least one projecting member of the second collar contacts the elongated member within a groove of the elongated member such that the second collar is slideable along the elongated member along a path of movement defined by that groove.

15. A support apparatus for multiple display devices, comprising:
an arm assembly; and
a multiple display device holding assembly attached to the arm assembly, the multiple display device holding assembly comprising:
an elongated member having an outer surface, a first end, a second end opposite the first end, and a central portion positioned between the first and second ends, the elongated member also having a groove defined in the outer surface of the elongated member;
a connector attaching the elongated member to the arm assembly, the connector attached to the central portion of the elongated member and positioned adjacent the groove to block a central portion of the groove to block motion of a first collar along the groove and to block motion of a second collar along the groove, the first collar slideably attachable to the elongated member such that the first collar is slideable along the elongated member from adjacent the first end to adjacent the connector, the first collar having an annular structure defining an inner opening that is configured to receive the elongated member and a first projecting member that extends into the inner opening of the first collar that is configured to be positionable in the groove and be slideable within the groove of the elongated member; and the second collar slideably attachable to the elongated member such that the second collar is slideable along the elongated member from adjacent the second end to adjacent the connector, the second collar having an annular structure defining an inner opening that is configured to receive the elongated member and a second projecting member that extends into the inner opening of the second collar that is configured to be positionable in the groove and be slideable within the groove of the elongated member.

16. The support apparatus of claim 15 wherein the multiple display device holding assembly also comprises a first mounting device attached to the first collar and a second mounting device attached to the second collar.

17. The support apparatus of claim 16 wherein the first mounting device is configured to attach to a first display device and the second mounting device is configured to attach to a second display device.

18. A support apparatus for multiple display devices, comprising:
an arm assembly; and
a multiple display device holding assembly attached to the arm assembly, the multiple display device holding assembly comprising:
an elongated member having an outer surface, a first end, a second end opposite the first end, and a central portion positioned between the first and second ends, the elongated member also having at least one of: at least one spline;
a connector attaching the elongated member to the arm assembly, the connector attached to the central portion of the elongated member,
a first collar slideably attachable to the elongated member such that the first collar is slideable along the elongated member from adjacent the first end to adjacent the connector, the first collar having at least one aperture that is sized to receive the at least one spline of the elongated member such that the first collar is slideable along the at least one spline of the elongated member, and
a second collar slideably attachable to the elongated member such that the second collar is slideable along the elongated member from adjacent the second end to adjacent the connector, the second collar having at least one aperture that is sized to receive the at least one spline of the elongated member such that the second collar is slideable along the at least one spline of the elongated member; and
wherein the connector is positioned on the central portion of the elongated member to block motion of the first and second collars such that the first collar is prevented from sliding along the elongated member past the central portion of the elongated member and the second collar is prevented from sliding along the elongated member past the central portion of the elongated member;

wherein the first collar has an annular structure defining the opening within an entirety of the annular structure of the first collar and the second collar has an annular structure defining the opening of the second collar within an entirety of the annular structure of the second collar; and
wherein the arm assembly is comprised of a first arm member attached to a second arm member and a second arm member that is pivotally and rotatably attached to a third arm member.

19. The support apparatus of claim 18 wherein the multiple display device holding assembly also comprises a first mounting device attached to the first collar and a second mounting device attached to the second collar;
the first mounting device is configured to attach to a first display device and the second mounting device is configured to attach to a second display device.

20. A support apparatus for multiple display devices, comprising:
an arm assembly; and
a multiple display device holding assembly attached to the arm assembly, the multiple display device holding assembly comprising:
an elongated member having an outer surface, a first end, a second end opposite the first end, and a central portion positioned between the first and second ends, the elongated member also having at least one spline;
a connector attaching the elongated member to the arm assembly, the connector attached to the central portion of the elongated member,
a first collar slideably attachable to the elongated member such that the first collar is slideable along the elongated member from adjacent the first end to adjacent the connector, the first collar having at least one aperture that is sized to receive the at least one spline of the elongated member such that the first collar is slideable along the at least one spline of the elongated member, and
a second collar slideably attachable to the elongated member such that the second collar is slideable along the elongated member from adjacent the second end to adjacent the connector, the second collar having at least one aperture that is sized to receive the at least one spline of the elongated member such that the second collar is slideable along the at least one spline of the elongated member; and
wherein the connector is positioned on the central portion of the elongated member to block motion of the first and second collars such that the first collar is prevented from sliding along the elongated member past the central portion of the elongated member and the second collar is prevented from sliding along the elongated member past the central portion of the elongated member;
a gas spring attached to the arm assembly; and
wherein the first collar has an annular structure defining the opening within an entirety of the annular structure of the first collar and the second collar has an annular structure defining the opening of the second collar within an entirety of the annular structure of the second collar.

21. The support apparatus of claim 20 wherein the multiple display device holding assembly also comprises a first mounting device attached to the first collar and a second mounting device attached to the second collar;
the first mounting device is configured to attach to a first display device and the second mounting device is configured to attach to a second display device.

* * * * *